United States Patent
Kitamura

(10) Patent No.: US 12,521,167 B2
(45) Date of Patent: Jan. 13, 2026

(54) ENERGY TREATMENT TOOL

(71) Applicant: OLYMPUS MEDICAL SYSTEMS CORP., Tokyo (JP)

(72) Inventor: Ojiro Kitamura, Hachioji (JP)

(73) Assignee: Olympus Medical Systems Corp., Tokyo (JP)

(*) Notice: Subject to any disclaimer, the term of this patent is extended or adjusted under 35 U.S.C. 154(b) by 543 days.

(21) Appl. No.: 18/100,093

(22) Filed: Jan. 23, 2023

(65) Prior Publication Data

US 2023/0233246 A1 Jul. 27, 2023

Related U.S. Application Data

(60) Provisional application No. 63/302,151, filed on Jan. 24, 2022.

(51) Int. Cl.
| | |
|---|---|
| *A61B 18/14* | (2006.01) |
| *A61B 17/32* | (2006.01) |
| A61B 17/28 | (2006.01) |
| A61B 18/00 | (2006.01) |

(52) U.S. Cl.
CPC .. *A61B 18/1442* (2013.01); *A61B 17/320092* (2013.01); *A61B 2017/2825* (2013.01); *A61B 2017/320078* (2017.08); *A61B 2018/00083* (2013.01); *A61B 2018/00607* (2013.01); *A61B 2018/00994* (2013.01)

(58) Field of Classification Search
CPC ........... A61B 17/320092; A61B 2017/320078; A61B 2018/00994
See application file for complete search history.

(56) References Cited

U.S. PATENT DOCUMENTS

| | | | |
|---|---|---|---|
| 2008/0132887 A1* | 6/2008 | Masuda | A61B 18/1445 606/205 |
| 2019/0142505 A1 | 5/2019 | Morisaki | |
| 2019/0216492 A1* | 7/2019 | Meiser | A61B 18/1442 |
| 2021/0196351 A1* | 7/2021 | Sarley | A61B 17/320092 |
| 2021/0228265 A1 | 7/2021 | Kobayashi et al. | |

FOREIGN PATENT DOCUMENTS

| | | |
|---|---|---|
| WO | 2018/011920 A1 | 1/2018 |
| WO | 2020/084665 A1 | 4/2020 |
| WO | 2021/137054 A1 | 7/2021 |

* cited by examiner

*Primary Examiner* — Sean W Collins
(74) *Attorney, Agent, or Firm* — Morgan, Lewis & Bockius LLP

(57) ABSTRACT

An energy treatment tool includes: a blade configured to transmit ultrasound vibration, an arm movable relative to the blade between an open position and a closed position, the arm including a surface on a blade-side of the arm, a pad provided on the surface, the pad including a first side and a second side opposite to the first side in a width direction of the arm, a first pin connected to the arm and extending along the width direction, a first electrode facing the first side of the pad and rotatable relative to the pad around the first pin, a second electrode facing the second side of the pad.

20 Claims, 13 Drawing Sheets

ENERGY TREATMENT TOOL

CROSS-REFERENCE TO RELATED APPLICATION

This application is based on and claims priority under 35 U.S.C. § 119 to U.S. Provisional Application No. 63/302,151, filed Jan. 24, 2022, the entire contents of which are incorporated herein by reference.

BACKGROUND

1. Technical Field

The present disclosure relates to an energy treatment tool.

2. Related Art

In the related art, there has been known an energy treatment tool configured to treat a treatment target by applying treatment energy to a portion which is a target to be treated in a living tissue (hereinafter, referred to as a treatment target) (for example, refer to WO 2020/084665 A).

In the energy treatment tool described in WO 2020/084665 A, ultrasound energy and high frequency energy are adopted as treatment energy.

Specifically, the energy treatment tool grips a treatment target between an ultrasound blade configured to transmit an ultrasound wave and a jaw configured to open and close relative to the ultrasound blade. Then, in the energy treatment tool, the treatment target is treated by applying ultrasound vibration to the treatment target from a portion on the distal end side of the ultrasound blade.

In addition, the energy treatment tool treats the treatment target by applying a high frequency current to the treatment target between the ultrasound blade and the jaw. Here, the jaw adopts a wiper structure including an arm configured to open and close relative to the ultrasound blade, and a rotating portion rotatably supported relative to the arm around a central axis in the width direction of the arm, the rotating portion having a function as an electrode that causes the high frequency current to flow through the treatment target between the rotating portion and the ultrasound blade. Additionally, the rotating portion is provided with a pad held in the rotating portion and configured to grip the treatment target between the pad and the ultrasound blade.

SUMMARY

In some embodiments, an energy treatment tool includes: a blade configured to transmit ultrasound vibration, an arm movable relative to the blade between an open position and a closed position, the arm including a surface on a blade-side of the arm, a pad provided on the surface, the pad including a first side and a second side opposite to the first side in a width direction of the arm, a first pin connected to the arm and extending along the width direction, a first electrode facing the first side of the pad and rotatable relative to the pad around the first pin, a second electrode facing the second side of the pad.

The above and other features, advantages and technical and industrial significance of this disclosure will be better understood by reading the following detailed description of presently preferred embodiments of the disclosure, when considered in connection with the accompanying drawings.

DETAILED DESCRIPTION

Figure 1:
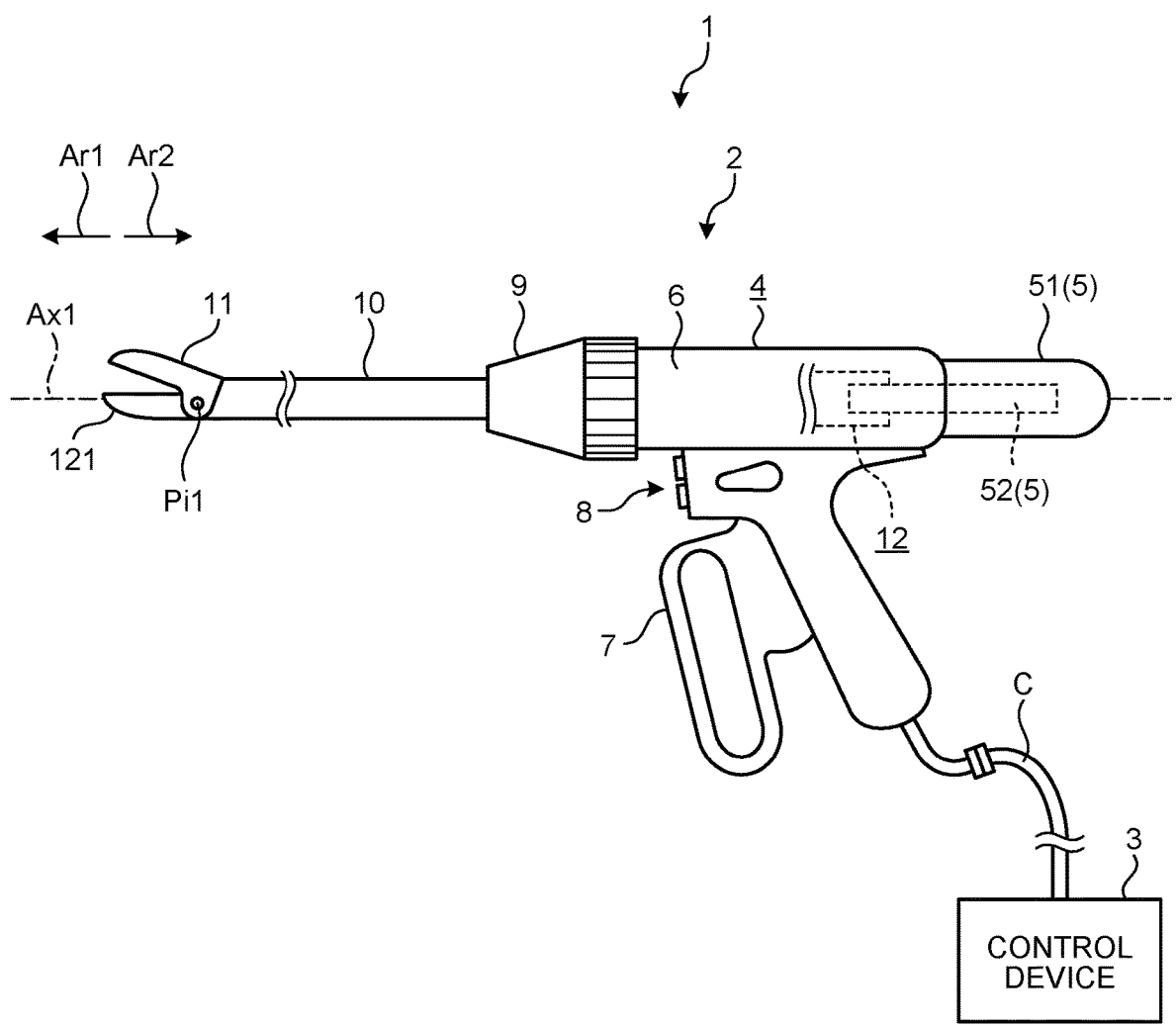
FIG. 1 is a diagram illustrating a treatment system according to an embodiment.

Hereinafter, modes for carrying out the disclosure (hereinafter referred to as embodiments) will be described with reference to the drawings. Note that the disclosure is not limited by the embodiments described below. Furthermore, in the description of the drawings, the same portions will be denoted by the same reference numerals.

Schematic Configuration of Treatment System

FIG. 1 is a diagram illustrating a treatment system 1 according to an embodiment.

The treatment system 1 applies treatment energy to a portion to be treated (hereinafter, referred to as a treatment target) in a living tissue, thereby treating the treatment target. The treatment energy in the present embodiment is ultrasound energy and high frequency energy. In addition, the treatment that can be performed by the treatment system 1 according to the present embodiment is treatment such as coagulation (sealing) of the treatment target or incision of the treatment target. Further, coagulation and incision may be performed simultaneously. As illustrated in FIG. 1, the treatment system 1 includes an energy treatment tool 2 and a control device 3.

Configuration of Energy Treatment Tool

Hereinafter, one side along a central axis Ax1 (FIG. 1) of a sheath 10 is referred to as a distal end side Ar1, and the other side is referred to as a proximal end side Ar2.

Figure 2:
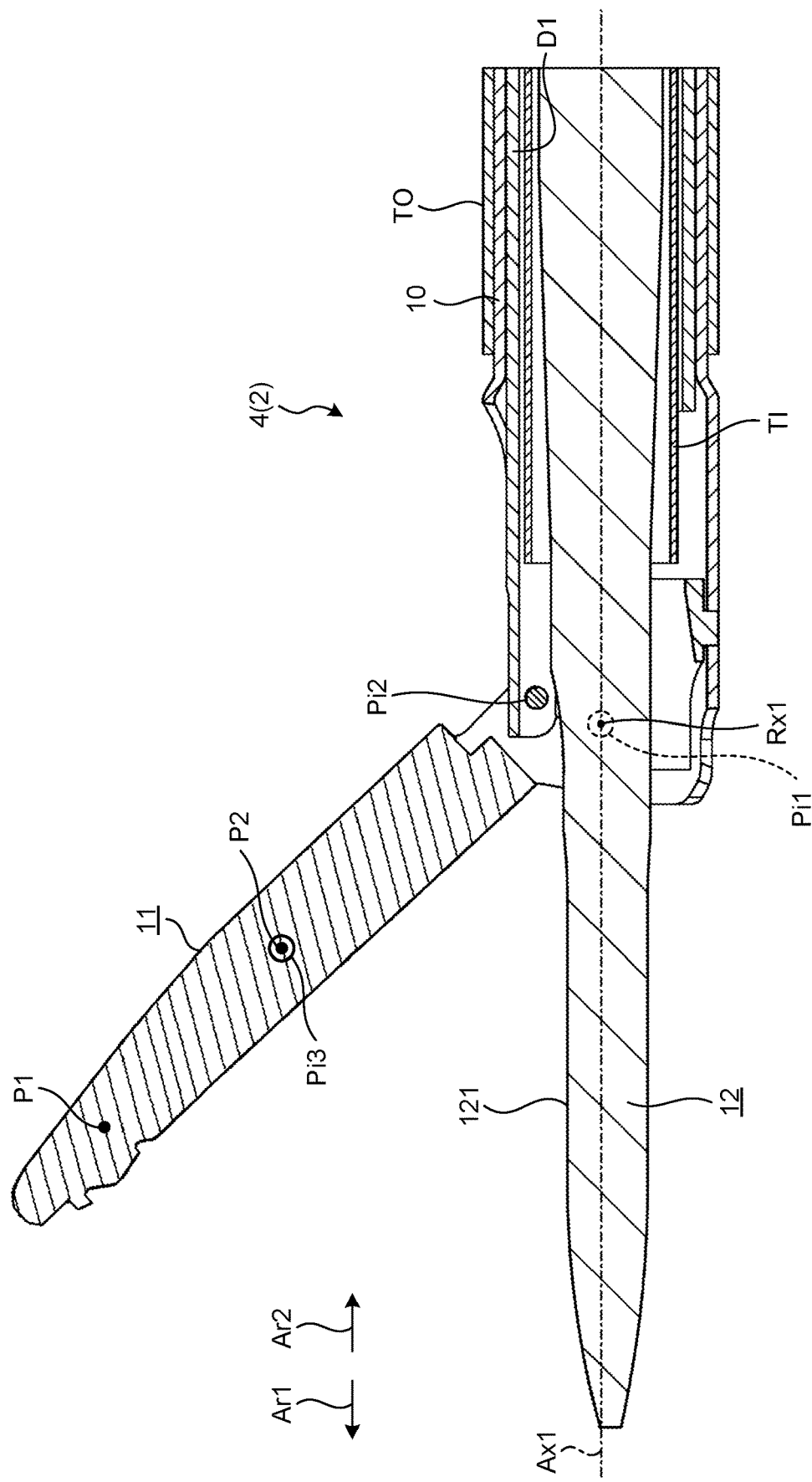
FIG. 2 is a diagram illustrating a configuration of a distal end portion in an energy treatment tool.

FIG. 2 is a diagram illustrating a configuration of a distal end portion in the energy treatment tool 2. Specifically, FIG. 2 is a cross-sectional view of the distal end portion of the energy treatment tool 2 cut by a plane including the central axis Ax1 of the sheath 10 in a state where a jaw 11 and an ultrasound blade 12 (blade) are included in the plane.

The energy treatment tool 2 is a treatment tool configured to treat a treatment target by applying ultrasound energy and high frequency energy to the treatment target. As illustrated in FIG. 1, the energy treatment tool 2 includes a handpiece 4 and an ultrasound transducer 5.

As illustrated in FIGS. 1 and 2, the handpiece 4 includes a holding case 6 (FIG. 1), an operation handle 7 (FIG. 1), a switch 8 (FIG. 1), a rotary knob 9 (FIG. 1), the sheath 10, the jaw 11, and the ultrasound blade 12.

The holding case 6 supports the entire energy treatment tool 2.

The operation handle 7 is movably attached to the holding case 6 and receives opening and closing operations by an operator such as a technician.

The switch 8 is provided in a state of being exposed to the outside of the holding case 6, and receives a treatment operation by an operator such as a technician.

The rotary knob 9 has a substantially cylindrical shape coaxial with the central axis Ax1, and is provided on the distal end side Ar1 of the holding case 6. Then, the rotary knob 9 receives a rotation operation by an operator such as a technician. By the rotation operation, the rotary knob 9 rotates around the central axis Ax1 relative to the holding case 6. The rotation of the rotary knob 9 rotates the sheath 10, the jaw 11, and the ultrasound blade 12 around the central axis Ax1.

The sheath 10 is a cylindrical pipe made of a conductive material such as metal.

In the sheath 10, a first pin Pi1 (FIGS. 1 and 2), extending in a direction orthogonal to the paper surface of FIG. 1 and pivotally supporting the jaw 11 so as to be rotatable around a first rotation axis Rx1 (FIG. 2), is fixed to an end portion on the distal end side Ar1.

The outer peripheral surface of the sheath 10 is covered with an electrically insulating outer tube TO (FIG. 2). Further, the inner peripheral surface of the sheath 10 is covered with an electrically insulating inner tube TI (FIG. 2).

The jaw 11 is partially made of a conductive material. As described above, the jaw 11 is configured to be rotatable around the first rotation axis Rx1 relative to the sheath 10 by being axially supported by the first pin Pi1 relative to the end portion on the distal end side Ar1 of the sheath 10. Then, the jaw 11 opens and closes relative to an end portion 121 on the distal end side of the ultrasound blade 12 (hereinafter, referred to as a treatment portion 121) in conjunction with the movement of an opening and closing mechanism D1 (FIG. 2) to the distal end side Ar1 or the proximal end side Ar2 according to the opening and closing operations on the operation handle 7 by an operator such as a technician. In other words, the jaw 11 is movable relative to the ultrasound blade 12 between an open position and a closed position. That is, the jaw 11 can grip the treatment target between the jaw 11 and the treatment portion 121.

A detailed configuration of the jaw 11 will be described in "Configuration of jaw" described later.

The ultrasound blade 12 is made of a conductive material and has an elongated shape extending linearly along the central axis Ax1. In addition, as illustrated in FIG. 2, the ultrasound blade 12 is inserted into the sheath 10 in a state where the treatment portion 121 protrudes to the outside. At this time, an end portion of the ultrasound blade 12 on the proximal end side Ar2 is mechanically connected to an ultrasound transducer 52 forming the ultrasound transducer 5, as illustrated in FIG. 1. Then, the ultrasound blade 12 transmits ultrasound vibration generated by the ultrasound transducer 5 from the end portion on the proximal end side Ar2 to the treatment portion 121. In the present embodiment, the ultrasound vibration is longitudinal vibration that vibrates in a direction along the central axis Ax1.

As illustrated in FIG. 1, the ultrasound transducer 5 includes a TD (transducer) case 51 and the ultrasound transducer 52.

The TD case 51 supports the ultrasound transducer 52 and is detachably connected to the holding case 6.

The ultrasound transducer 52 generates ultrasound vibration under the control of the control device 3. In the present embodiment, the ultrasound transducer 52 is a bolted Langevin type transducer (BLT).

Configuration of Control Device

The control device 3 comprehensively controls the operation of the energy treatment tool 2 via the electric cable C (FIG. 1).

Specifically, the control device 3 detects a treatment operation on the switch 8 by an operator such as a technician via the electric cable C. Then, upon detecting the treatment operation, the control device 3 applies treatment energy to a treatment target gripped between the jaw 11 and the treatment portion 121 via the electric cable C. That is, the control device 3 treats the treatment target.

For example, when applying ultrasound energy to the treatment target, the control device 3 supplies drive power to the ultrasound transducer 52 via the electric cable C. As a result, the ultrasound transducer 52 generates longitudinal vibration (ultrasound vibration) that vibrates in a direction along the central axis Ax1. In addition, the treatment portion 121 vibrates with a desired amplitude by the longitudinal vibration. Then, the ultrasound vibration is applied from the treatment portion 121 to the treatment target gripped between the jaw 11 and the treatment portion 121. In other words, ultrasound energy is applied from the treatment portion 121 to the treatment target.

In addition, for example, when applying high-frequency energy to the treatment target, the control device 3 supplies high-frequency power between the jaw 11 and the ultrasound blade 12 via the electric cable C. When the high-frequency power is supplied between the jaw 11 and the ultrasound blade 12, a high frequency current flows through the treatment target gripped between the jaw 11 and the treatment portion 121. In other words, the high frequency energy is applied to the treatment target.

Configuration of Jaw

Next, the configuration of the jaw 11 will be described.

Note that, in the following description of the configuration of the jaw 11, a side away from the treatment portion 121 will be referred to as a back surface side Ar3 (refer to FIGS. 3 to 5), and a side close to the treatment portion 121 will be referred to as a treatment portion side Ar4 (refer to FIGS. 3 to 5). In addition, a "width direction" described below is a direction orthogonal to the central axis Ax1 and the opening-and-closing direction of the jaw 11 relative to the treatment portion 121, and means a direction orthogonal to the paper surfaces of FIGS. 2 and 5, and the left-and-right direction of FIGS. 3, 4, and 6.

Figure 3:
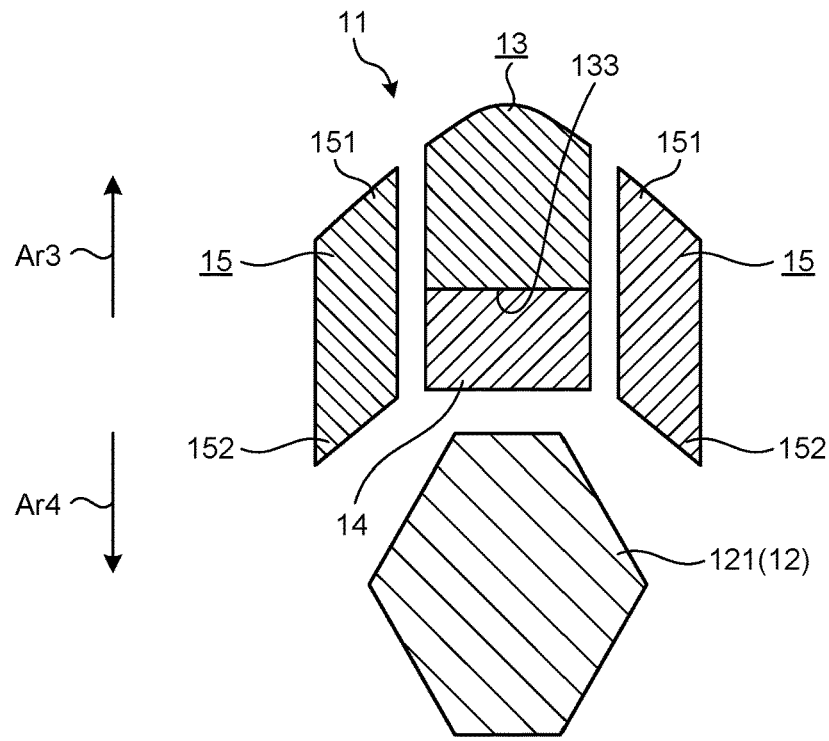
FIG. 3 is a diagram illustrating a configuration of a jaw.
Figure 4:
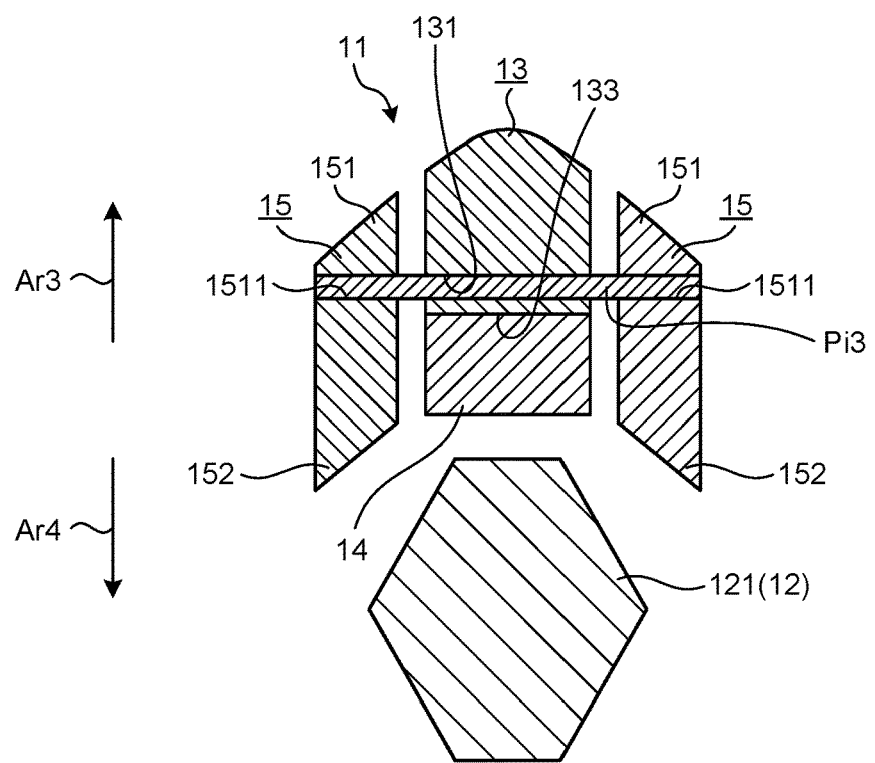
FIG. 4 is a diagram illustrating the configuration of the jaw.
Figure 5:
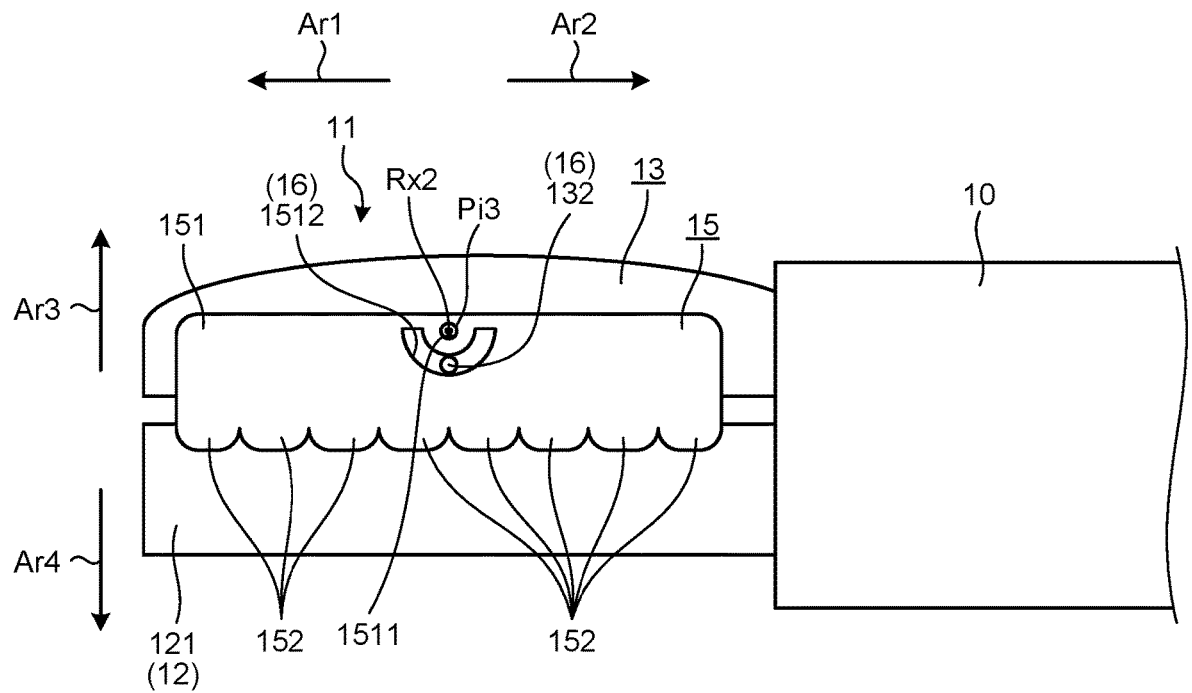
FIG. 5 is a diagram illustrating the configuration of the jaw.
Figure 6:
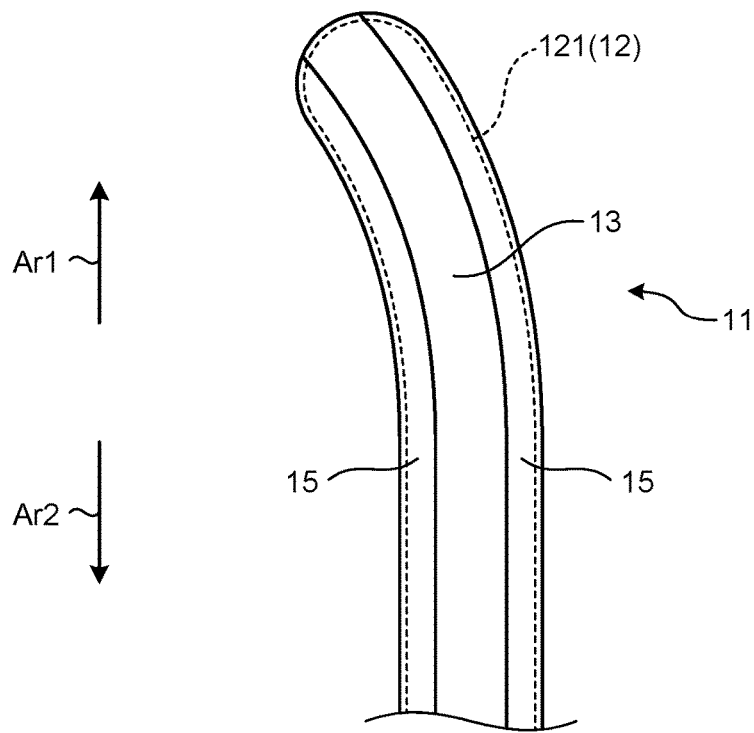
FIG. 6 is a diagram illustrating the configuration of the jaw.

FIGS. 3 to 6 are diagrams illustrating the configuration of the jaw 11. Specifically, FIG. 3 is a cross-sectional view of the jaw 11 taken along a plane orthogonal to the central axis Ax1 at a position P1 illustrated in FIG. 2. FIG. 4 is a cross-sectional view of the jaw 11 taken along a plane orthogonal to the central axis Ax1 at a position P2 illustrated in FIG. 2. The position P2 is an arrangement position of a third pin Pi3. Further, the position P1 is a position on the distal end side Ar1 relative to the position P2. FIG. 5 is a diagram of the jaw 11 when viewed from the side in the width direction. FIG. 6 is a diagram of the jaw 11 when viewed from the back surface side Ar3.

As illustrated in FIGS. 3 to 5, the jaw 11 includes an arm 13, a pad 14, and a pair of wiper jaws 15.

The arm 13 is an elongated member made of a conductive material. In the present embodiment, as illustrated in FIG. 6, a longitudinal direction of the arm 13 is a direction along a curve toward one side in the width direction from the proximal end side Ar2 toward the distal end side Ar1 when viewed from the back surface side Ar3. That is, the arm 13 has a second curved shape having a second curvature. The ultrasound blade 12 (the treatment portion 121) has a first curved shape having the first curvature. Note that the longitudinal direction of the treatment portion 121 is the same as the longitudinal direction of the arm 13 (FIG. 6). In other words, the first curvature is the same as the second curvature.

In the arm 13, the first pin Pi1 is inserted into the end portion on the proximal end side Ar2. The arm 13 is pivotally supported on the sheath 10 so as to be rotatable around the first rotation axis Rx1.

In the arm 13, a second pin Pi2 (FIG. 2) fixed to the end portion on the distal end side Ar1 of the opening and closing mechanism D1 is inserted into the end portion on the proximal end side Ar2. Thus, the arm 13 is connected to the opening and closing mechanism D1. Then, the arm 13 rotates around the first rotation axis Rx1 in conjunction with the movement of the opening and closing mechanism D1 to the distal end side Ar1 or the proximal end side Ar2 according to the opening and closing operations on the operation handle 7 by an operator such as a technician.

Furthermore, the arm 13 includes a through-hole 131 formed to penetrate the arm 13 in the width direction at a substantially central portion in the longitudinal direction, wherein the through-hole 131 has the third pin Pi3 (FIGS. 4 and 5) made of a conductive material inserted thereinto. The third pin Pi3 is a pin configured to rotate the pair of wiper jaws 15 around a second rotation axis Rx2 (FIG. 5) relative to the arm 13, and corresponds to a connection portion.

In the arm 13, as illustrated in FIG. 5, a convex portion 132 (first detent) protruding from a position below the through-hole 131 is provided on each of the opposite side surfaces in the width direction.

The pad 14 is made of a resin material having electrical insulation and biocompatibility, for example, polytetrafluoroethylene (PTFE), and has a substantially rectangular parallelepiped shape extending in the longitudinal direction of the arm 13. As illustrated in FIGS. 3 and 4, the pad 14 is fixed to a surface 133 on the treatment portion side Ar4 of the arm 13. Note that, as a method of fixing the pad 14 to the arm 13, for example, a fixing method of mechanically fixing the pad 14 by causing a claw portion to protrude from the surface 133 on the treatment portion side Ar4 of the arm 13 and locking the pad 14 to the claw portion, insert molding, or the like can be exemplified.

Figure 7:
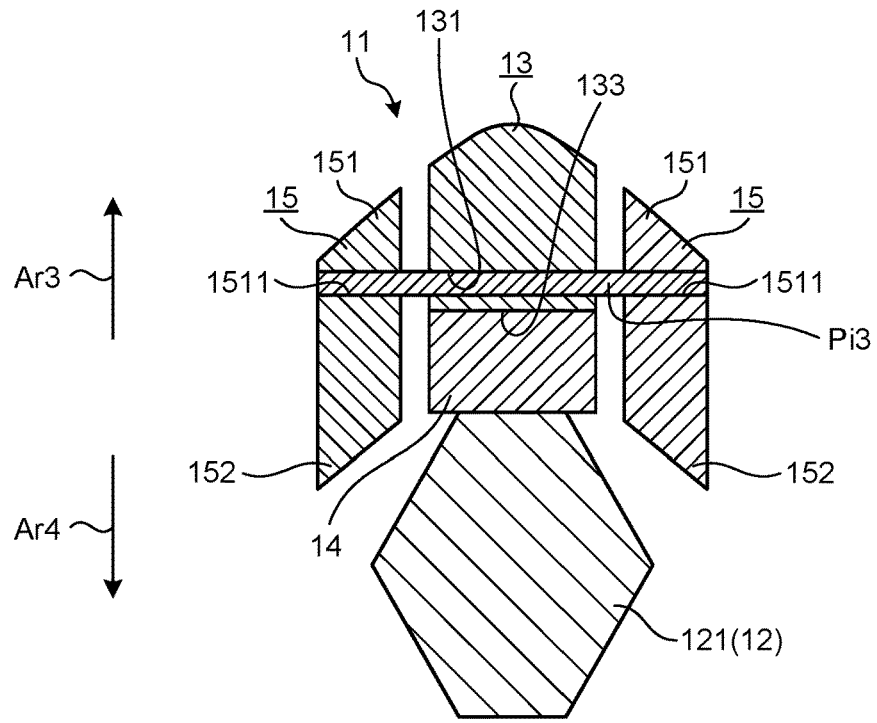
FIG. 7 is a diagram illustrating a positional relationship between a pair of wiper jaws and a treatment portion.

Then, when the jaw 11 is brought close to the treatment portion 121, the pad 14 abuts on the treatment portion 121 (refer to FIG. 7).

The pair of wiper jaws 15 corresponds to a pair of rotating portions. The pair of wiper jaws 15 is made of a conductive material, and is disposed on the opposite sides of the arm 13 and the pad 14 in the width direction, as illustrated in FIGS. 3 and 4. In other words, The pair of wiper jaws 15 (the pair of wiper jaws) is comprised a first rotation portion (a first electrode) and a second rotation portion (a second electrode). The pair of wiper jaws 15 has a symmetrical shape relative to a plane orthogonal to the width direction. Therefore, only the configuration of one wiper jaw 15 will be described below.

As illustrated in FIGS. 3 to 5, the wiper jaw 15 includes a wiper jaw main body 151 and a plurality of teeth 152.

The wiper jaw main body 151 is formed by an elongated member extending in the longitudinal direction of the arm 13.

As illustrated in FIG. 5, the wiper jaw main body 151 includes an insertion hole 1511 formed to penetrate the wiper jaw main body 151 in the width direction at a substantially central portion in the longitudinal direction, wherein the insertion hole 1511 has the third pin Pi3 inserted thereinto. Here, the third pin Pi3 is fixed to the wiper jaw main body 151 by welding, caulking, or the like in a state of being inserted into the insertion hole 1511. Then, the pair of wiper jaws 15 rotates integrally with the third pin Pi3 in a state of being interlocked with each other around the second rotation axis Rx2.

In the wiper jaw main body 151, as illustrated in FIG. 5, an arc-shaped groove 1512 (first groove) formed to penetrate the wiper jaw main body 151 in the width direction and centered on the insertion hole 1511 is provided at a position below the insertion hole 1511. The convex portion 132 is inserted into the groove 1512. When the wiper jaw 15 rotates around the second rotation axis Rx2, the convex portion 132 abuts on the arc-shaped end surface of the groove 1512, whereby the rotation is regulated. That is, the convex portion 132 and the groove 1512 correspond to a rotation regulation portion 16 (FIG. 5).

The plurality of teeth 152 respectively protrude from the surface of the wiper jaw main body 151 on the treatment portion side Ar4 toward the treatment portion side Ar4, and are arranged side by side in the longitudinal direction of the wiper jaw main body 151.

When a treatment target is gripped between the jaw 11 and the treatment portion 121, the pair of wiper jaws 15 rotates around the second rotation axis Rx2 to substantially equalize gripping force relative to the entire treatment target. The pair of wiper jaws 15 is electrically connected to the arm 13 through the third pin Pi3. Therefore, when high-frequency power is supplied between the jaw 11 and the ultrasound blade 12 from the control device 3, a high frequency current flows between the pair of wiper jaws 15 and the treatment portion 121.

When the jaw 11 is brought close to the treatment portion 121, a surface on the back surface side Ar3 of the pair of wiper jaws 15 described above is located closer to the treatment portion side Ar4 than a surface on the back surface side Ar3 of the arm 13 (FIG. 4).

Regarding Positional Relationship Between the Pair of Wiper Jaws and the Treatment Portion Next, a positional relationship between the pair of wiper jaws 15 and the treatment portion 121 will be described.

Figure 8:
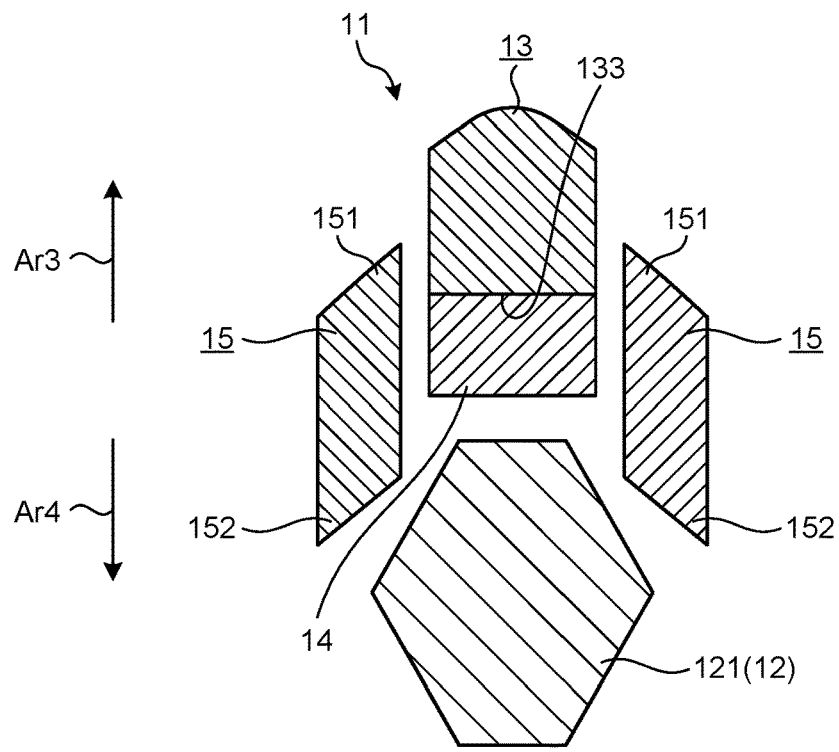
FIG. 8 is a diagram illustrating the positional relationship between the pair of wiper jaws and the treatment portion.

FIGS. 7 and 8 are diagrams illustrating the positional relationship between the pair of wiper jaws 15 and the treatment portion 121. Specifically, FIG. 7 is a cross-sectional view corresponding to FIG. 4, and is a view illustrating a state in which the pad 14 abuts on the treatment portion 121 when the jaw 11 is brought close to the treatment portion 121. FIG. 8 is a cross-sectional view corresponding to FIG. 3, and is a view illustrating a state in which the pair of wiper jaws 15 is maximally rotated around the second rotation axis Rx2 in a direction in which the end portions on the distal end side Ar1 of the pair of wiper jaws 15 approach the treatment portion 121.

As illustrated in FIG. 7, the pair of wiper jaws 15 is set to be separated from the treatment portion 121 in a state where the pad 14 and the treatment portion 121 are in contact with each other.

As illustrated in FIG. 8, the pair of wiper jaws 15 is set to be separated from the treatment portion 121 in the rotation range regulated by the rotation regulation portion 16. Although only the portion on the distal end side Ar1 of the pair of wiper jaws 15 is illustrated in FIG. 8, the pair of wiper jaws 15 is separated from the treatment portion 121 even when the pair of wiper jaws 15 is maximally rotated around the second rotation axis Rx2 in the direction in which the end portions on the proximal end side Ar2 of the pair of wiper jaws 15 approach the treatment portion 121.

According to the present embodiment described above, the following effects are obtained.

In the energy treatment tool 2 according to the present embodiment, the pad 14 is fixed to the surface 133 on the treatment portion side Ar4 of the arm 13. Therefore, the heat transferred to the pad 14 at the time of treatment of the treatment target can be released to the arm 13. In addition, even when the treatment target is gripped at the distal end portion of the jaw 11, since the pad 14 is not fixed to the wiper jaw 15, the proximal end side Ar2 of the pad 14 does not come into strong contact with the ultrasound blade 12.

Therefore, according to the energy treatment tool 2 according to the present embodiment, it is possible to suppress deterioration of the pad 14.

Further, in the energy treatment tool 2 according to the present embodiment, since the pad 14 is not fixed to the wiper jaw 15, rattling according to the rotation of the wiper jaw 15 does not occur when the treatment target is gripped. Therefore, operability can be improved.

In the energy treatment tool 2 according to the present embodiment, the pair of wiper jaws 15 is set to be separated from the ultrasound blade 12 in a state where the pad 14 and the ultrasound blade 12 are in contact with each other. Furthermore, the pair of wiper jaws 15 is set to be separated from the ultrasound blade 12 in the rotation range regulated by the rotation regulation portion 16. Therefore, a short circuit between the pair of wiper jaws 15 and the ultrasound blade 12 can be reliably avoided.

In the energy treatment tool 2 according to the present embodiment, when the jaw 11 is brought close to the treatment portion 121, the surface on the back surface side Ar3 of the pair of wiper jaws 15 is located closer to the treatment portion side Ar4 than the surface on the back surface side Ar3 of the arm 13. Therefore, when the jaw 11 is closed relative to the treatment portion 121, the treatment portion 121 and the jaw 11 in this state are inserted into the hole-shaped treatment target, and the treatment target is peeled off, rattling according to the rotation of the wiper jaw 15 does not occur. Therefore, operability can be improved.

OTHER EMBODIMENTS

Although the embodiment for carrying out the disclosure has been described so far, the disclosure should not be limited only by the above-described embodiment.

In the above-described embodiment, the opening and closing mechanism D1 is provided inside the sheath 10, but the disclosure is not limited thereto. For example, the sheath 10 itself may move to the distal end side Ar1 or the proximal end side Ar2 to open and close the jaw 11 relative to the treatment portion 121. In addition, the opening and closing of the jaw 11 may be configured to be closed relative to the treatment portion 121 when the opening and closing mechanism D1 and the sheath 10 move to the distal end side Ar1, or may be configured to be closed relative to the treatment portion 121 when the opening and closing mechanism D1 and the sheath 10 move to the proximal end side Ar2.

In the above-described embodiment, the ultrasound transducer 5 is configured to be detachable from the handpiece 4, but the disclosure is not limited thereto, and a configuration in which the ultrasound transducer 5 is incorporated into the handpiece 4 may be adopted.

In the above-described embodiment, the number of switches 8 is not limited to two illustrated in FIG. 1, and may be one or three or more.

In the above-described embodiment, when high-frequency power is supplied between the jaw 11 and the ultrasound blade 12, the pair of wiper jaws 15 side may be used as a reference voltage, and conversely, the ultrasound blade 12 side may be used as a reference voltage.

First Modification

Figure 9:
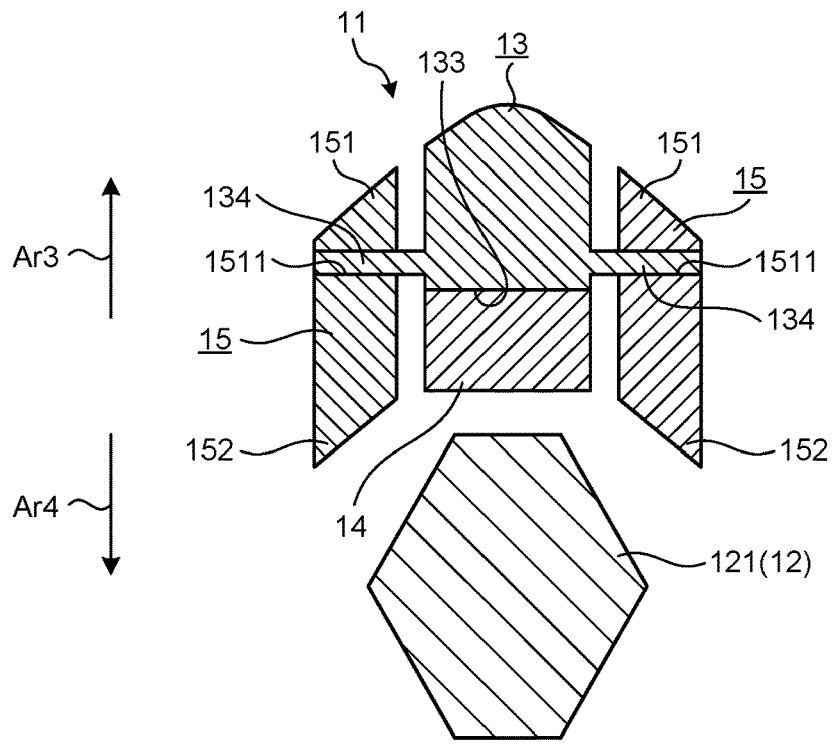
FIG. 9 is a diagram illustrating a first modification of the embodiment.

FIG. 9 is a diagram illustrating a first modification of the embodiment. Specifically, FIG. 9 is a cross-sectional view corresponding to FIG. 4.

In the above-described embodiment, the third pin Pi3 is adopted as the connection portion, but the disclosure is not limited thereto, and a pair of protrusions 134 according to the first modification illustrated in FIG. 9 may be adopted. At this time, the third pin Pi3 becomes unnecessary. Further, the arm 13 is not provided with the through-hole 131.

Specifically, as illustrated in FIG. 9, the pair of protrusions 134 are portions respectively protruding from opposite side surfaces of the arm 13 in the width direction. The pair of protrusions 134 is comprised a first protrusion and a second protrusion. Then, the protrusion 134 is inserted into the insertion hole 1511. At this time, in order to achieve a structure in which the wiper jaw 15 is not detached from the protrusion 134, the distal end of the protrusion 134 is made thicker than other portions by caulking or the like after the protrusion 134 is inserted into the insertion hole 1511. As the structure in which the wiper jaw 15 is not detached from the protrusion 134, a resin cover RC (cover) described in a third modification described later may be used, and the pair of wiper jaws 15 may be pressed from opposite sides in the width direction by the resin cover RC.

The pair of wiper jaws 15 rotates independently of each other around the second rotation axis Rx2 relative to the pair of protrusions 134.

As the structure for rotating the pair of wiper jaws 15 independently of each other around the second rotation axis Rx2, the following structure may be adopted in the above-described embodiment.

The third pin Pi3 is fixed to the arm 13. On the other hand, the third pin Pi3 is not fixed to the wiper jaw main body 151. As a result, the pair of wiper jaws 15 rotates independently of each other around the second rotation axis Rx2 relative to the third pin Pi3.

Second Modification

Figure 10:
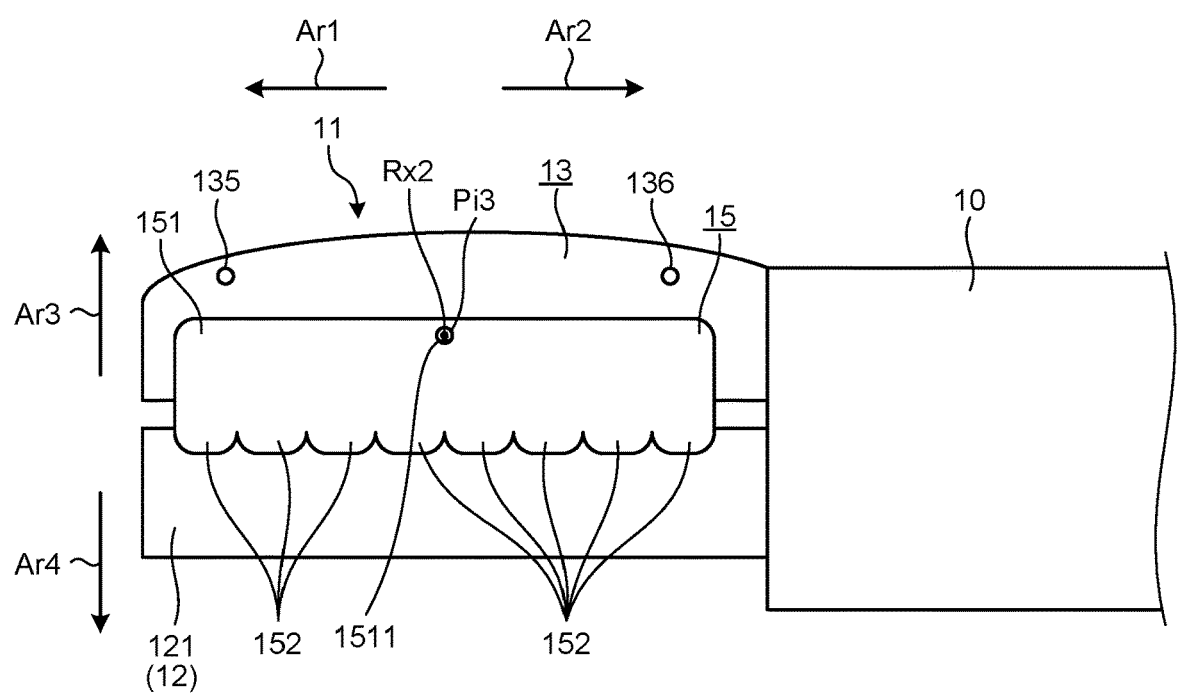
FIG. 10 is a diagram illustrating a second modification of the embodiment.

FIG. 10 is a diagram illustrating a second modification of the embodiment. Specifically, FIG. 10 is a diagram corresponding to FIG. 5.

In the above-described embodiment, the convex portion 132 and the groove 1512 are adopted as the rotation regulation portion, but the disclosure is not limited thereto, and a pair of distal end side convex portions 135 and a pair of proximal end side convex portions 136 according to the second modification illustrated in FIG. 10 may be adopted. In this case, the arm 13 is not provided with the convex portion 132. Further, the wiper jaw 15 is not provided with the groove 1512.

Specifically, as illustrated in FIG. 10, the pair of distal end side convex portions 135 is portions of the arm 13, the portions respectively protruding from portions on the distal end side Ar1 on the opposite side surfaces in the width direction. Similarly, the pair of proximal end side convex portions 136 is portions of the arm 13, the portions respectively protruding from the portions on the proximal end side Ar2 on the opposite side surfaces in the width direction.

When the wiper jaw 15 rotates around the second rotation axis Rx2, the distal end side convex portion 135 or the proximal end side convex portion 136 abuts on an outer edge of the wiper jaw 15, whereby the rotation is regulated.

Third Modification

Figure 11:
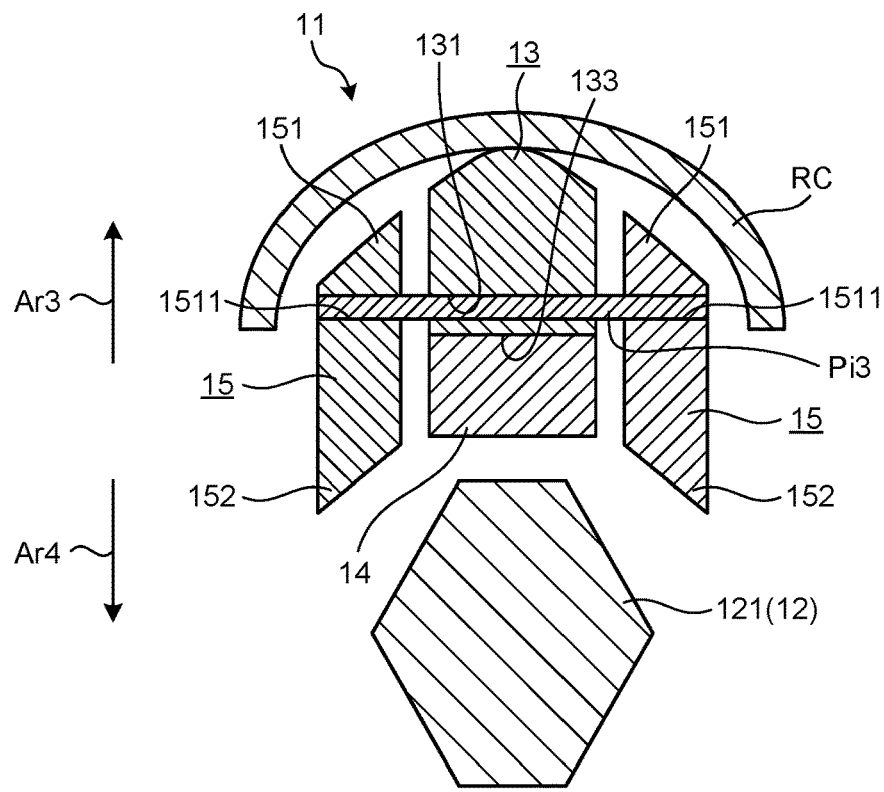
FIG. 11 is a diagram illustrating a third modification of the embodiment.

FIG. 11 is a diagram illustrating a third modification of the embodiment. Specifically, FIG. 11 is a cross-sectional view corresponding to FIG. 4.

In the above-described embodiment, the convex portion 132 and the groove 1512 are adopted as the rotation regulation portion, but the disclosure is not limited thereto, and a resin cover RC according to the third modification illustrated in FIG. 11 may be adopted. In this case, the arm 13 is not provided with the convex portion 132. Further, the wiper jaw 15 is not provided with the groove 1512.

The resin cover RC has electrical insulation, and is fixed to the surface on the back surface side Ar3 of the arm 13 in a state of covering the surface, as illustrated in FIG. 11. Examples of a method of fixing the resin cover RC to the surface on the back surface side Ar3 of the arm 13 include a fixing method of mechanically fixing the resin cover RC using a snap-fit or a metal pin, and insert molding.

When the wiper jaw 15 rotates around the second rotation axis Rx2, the surface on the treatment portion side Ar4 of the resin cover RC abuts on the outer edge of the wiper jaw 15, whereby the rotation is regulated.

Fourth Modification

Figure 12:
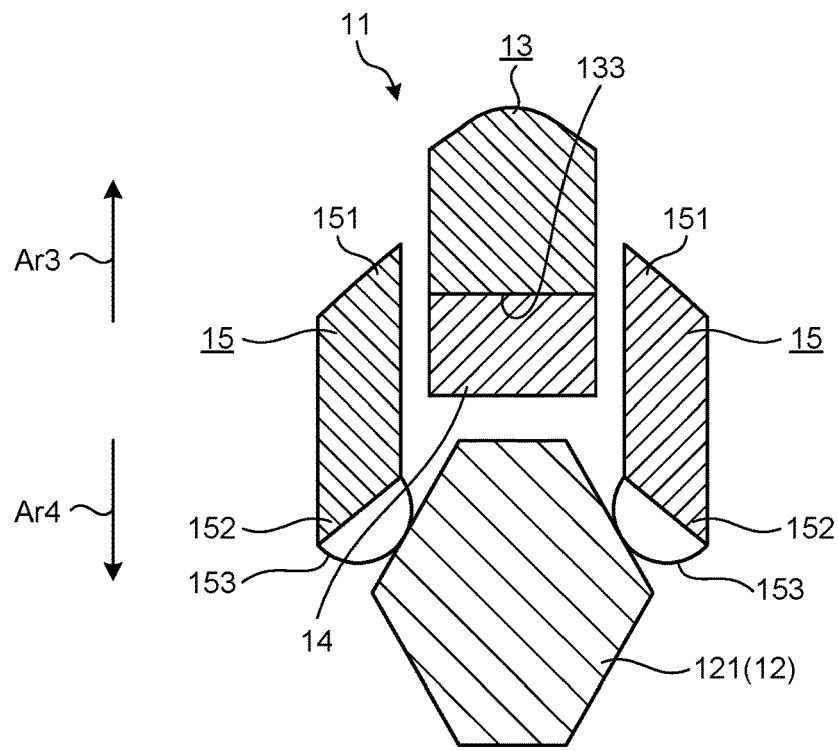
FIG. 12 is a diagram illustrating a fourth modification of the embodiment.

FIG. 12 is a diagram illustrating a fourth modification of the embodiment. Specifically, FIG. 12 is a cross-sectional view corresponding to FIG. 8.

In the embodiment described above, a gap portion 153 according to the fourth modification illustrated in FIG. 12 may be provided on the surface of the teeth 152 facing the treatment portion 121.

Specifically, the gap portion 153 has electrical insulation, and is formed in a hemispherical shape as illustrated in FIG. 12. The gap portion 153 may be provided in each of the teeth 152 at least on the distal end side Ar1 and the proximal end side Ar2 among the plurality of teeth 152. The gap portion 153 provided on the distal end side Ar1 abuts on the treatment portion 121 when the pair of wiper jaws 15 is maximally rotated around the second rotation axis Rx2 in the direction in which the end portions on the distal end side Ar1 of the pair of wiper jaws 15 approach the treatment portion 121. The gap portion 153 provided on the proximal end side Ar2 abuts on the treatment portion 121 when the pair of wiper jaws 15 is maximally rotated around the second rotation axis Rx2 in the direction in which the end portions on the proximal end side Ar2 of the pair of wiper jaws 15 approach the treatment portion 121.

Fifth Modification

Figure 13:
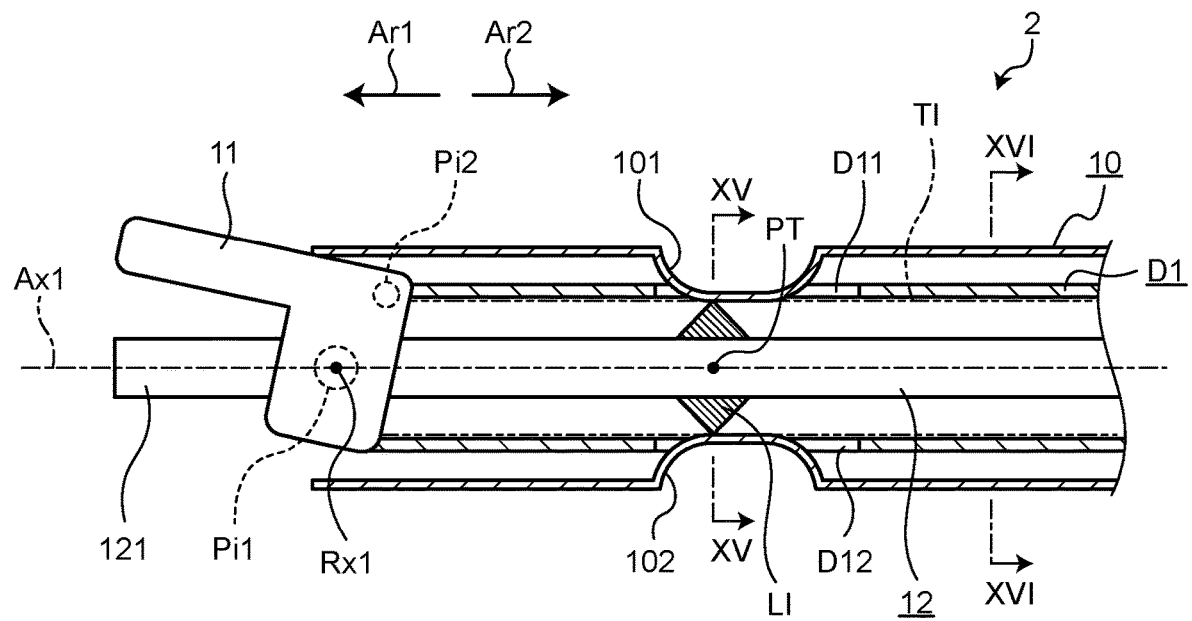
FIG. 13 is a diagram illustrating a fifth modification of the embodiment.
Figure 14:
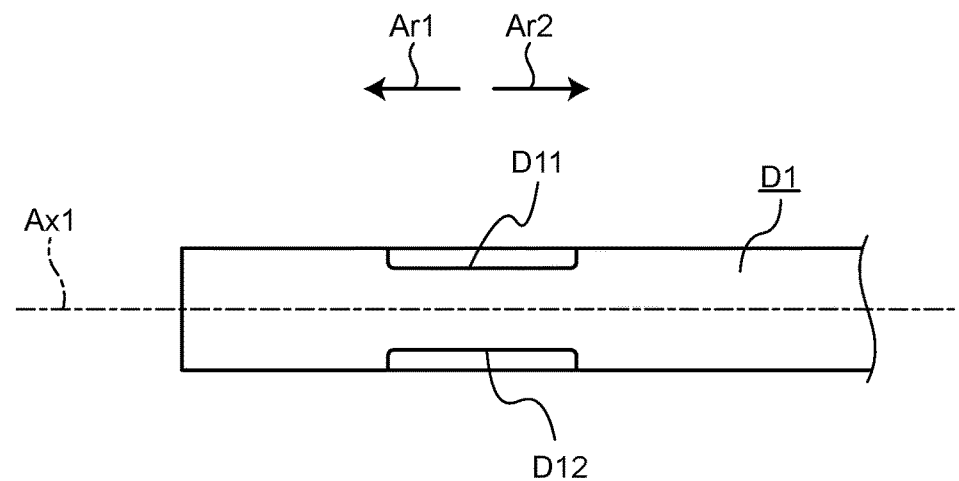
FIG. 14 is a diagram illustrating the fifth modification of the embodiment.
Figure 15:
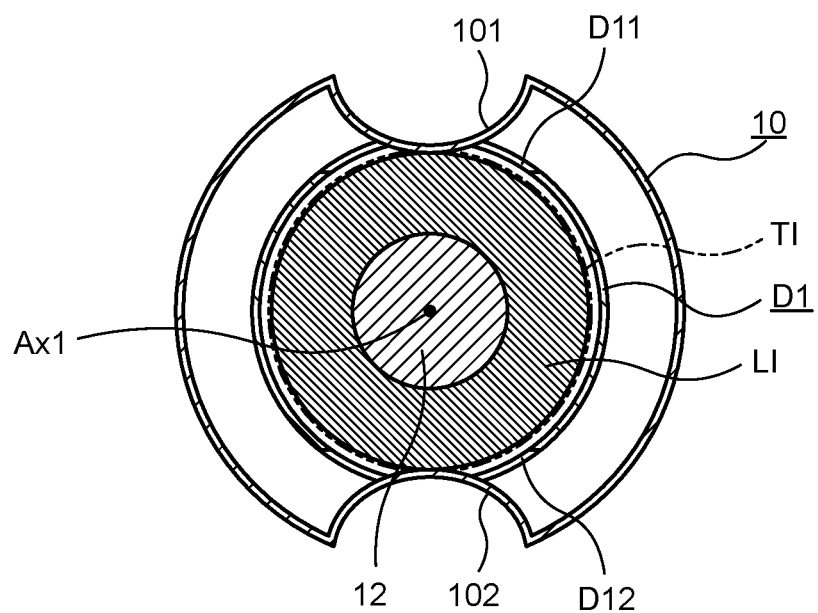
FIG. 15 is a diagram illustrating the fifth modification of the embodiment.
Figure 16:
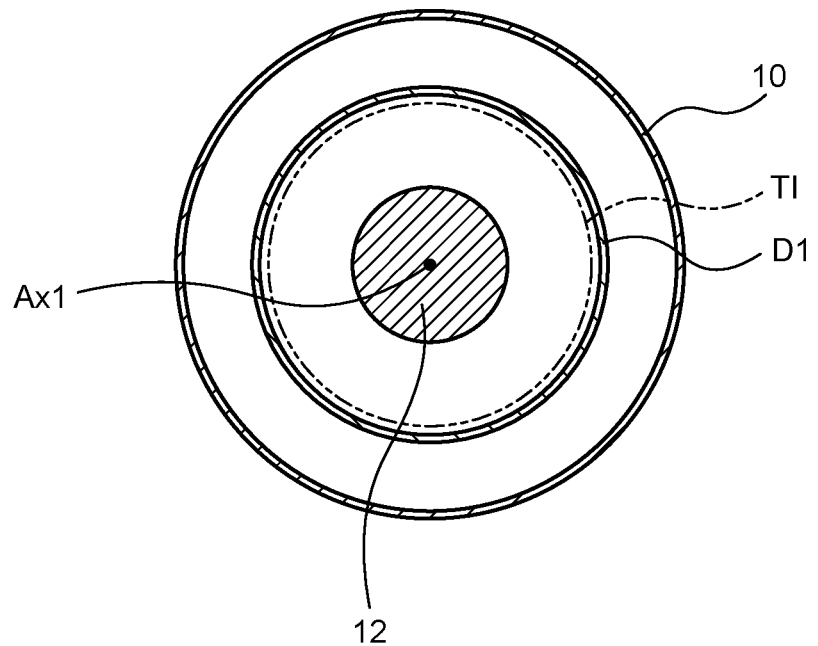
FIG. 16 is a diagram illustrating the fifth modification of the embodiment.

FIGS. 13 to 16 are diagrams illustrating a fifth modification of the embodiment. FIG. 13 is a cross-sectional view corresponding to FIG. 2. In FIG. 13, for convenience of description, the inner tube TI is indicated by a two-dot chain line, and illustration of the outer tube TO is omitted. FIG. 14 is a view of the opening and closing mechanism D1 according to the fifth modification when viewed from the side in the width direction. FIG. 15 is a cross-sectional view taken along line XV-XV of FIG. 13. FIG. 16 is a cross-sectional view taken along line XVI-XVI of FIG. 13.

In the above-described embodiment, the fixing structure according to the fifth modification may be adopted between the ultrasound blade 12 and the sheath 10.

In FIGS. 13 and 15, a reference sign "LI" denotes a lining. The lining LI is formed of an elastic rubber material, has an annular shape into which the ultrasound blade 12 is inserted, and is attached to an outer peripheral surface of the ultrasound blade 12. Then, the inner tube TI is attached to the outer peripheral surface of the ultrasound blade 12 in a state where the ultrasound blade 12 having the lining LI attached thereto is inserted inside.

Note that a plurality of the linings LI are provided and respectively disposed at the positions of nodes of longitudinal vibration in the ultrasound blade 12. FIGS. 13 and 15 only illustrate the lining LI disposed at a position PT of the node on the most distal end side Ar1 among the positions of the nodes of the longitudinal vibration.

The opening and closing mechanism D1 corresponds to a first cylindrical portion, and is a cylindrical pipe having a smaller diameter dimension than that of the sheath 10. The opening and closing mechanism D1 is inserted into the sheath 10. The ultrasound blade 12 to which the lining LI and the inner tube TI are attached is inserted into the opening and closing mechanism D1.

Here, in the opening and closing mechanism D1, through holes D11 and D12 formed to penetrate the inside and the outside are respectively provided at upper and lower positions in FIGS. 13 and 14 facing the lining LI. These through holes D11 and D12 correspond to a cutout portion. Each of the through holes D11 and D12 is set to a size in which pressing portions 101 and 102 of the sheath 10 to be described later and edge portions of the through holes D11 and D12 do not mechanically interfere with each other when the opening and closing mechanism D1 moves to the distal end side Ar1 or the proximal end side Ar2 according to the opening and closing operations on the operation handle 7 by an operator such as a technician.

The sheath 10 corresponds to a second cylindrical portion. As illustrated in FIGS. 13 and 15, the sheath 10 is provided with pressing portions 101 and 102 at respective positions facing the through holes D11 and D12.

Each of the pressing portions 101 and 102 is formed by caulking, for example, protrudes toward the inside of the sheath 10, passes through the through holes D11 and D12, and presses the upper and lower portions in FIGS. 13 and 15 of the lining LI covered with the inner tube TI at the respective tip portions. That is, the ultrasound blade 12 is fixed by the sheath 10 (pressing portions 101 and 102).

According to the fifth modification described above, the following effects are obtained in addition to the same effects as those of the above-described embodiments.

In the energy treatment tool 2 according to the fifth modification, the lining LI provided at the node position PT is fixed by the pressing portions 101 and 102 through the through holes D11 and D12. That is, the ultrasound blade 12 is fixed by the sheath 10.

Therefore, bending of the ultrasound blade 12 when the jaw 11 is closed can be suppressed. In addition, since the through holes D11 and D12 are provided in the opening and closing mechanism D1, the pressing portions 101 and 102 and the opening and closing mechanism D1 do not mechanically interfere with each other, and the opening and closing mechanism D1 can be smoothly moved to the distal end side Ar1 or the proximal end side Ar2. Therefore, treatment performance can be stabilized.

In FIG. 13, only the lining LI disposed at the position PT of the node on the most distal end side Ar1 among the node positions of the longitudinal vibration is illustrated, and the structure in which the lining LI is fixed by the pressing portions 101 and 102 through the through holes D11 and D12 is illustrated. Here, only the lining LI disposed at the position PT of the node on the most distal end side Ar1 may be fixed by the structure, or a plurality of linings LI respectively disposed at the positions of a plurality of nodes may be fixed by the structure, respectively.

Sixth Modification

In the above-described fifth modification, a configuration may be adopted in which through holes similar to the through holes D11 and D12 of the opening and closing mechanism D1 are formed in the inner tube TI, and the pressing portions 101 and 102 directly abut on the lining LI.

Even in a case where the configuration according to the sixth modification described above is adopted, the same effects as those of the fifth modification described above are obtained.

Seventh Modification

Figure 17:
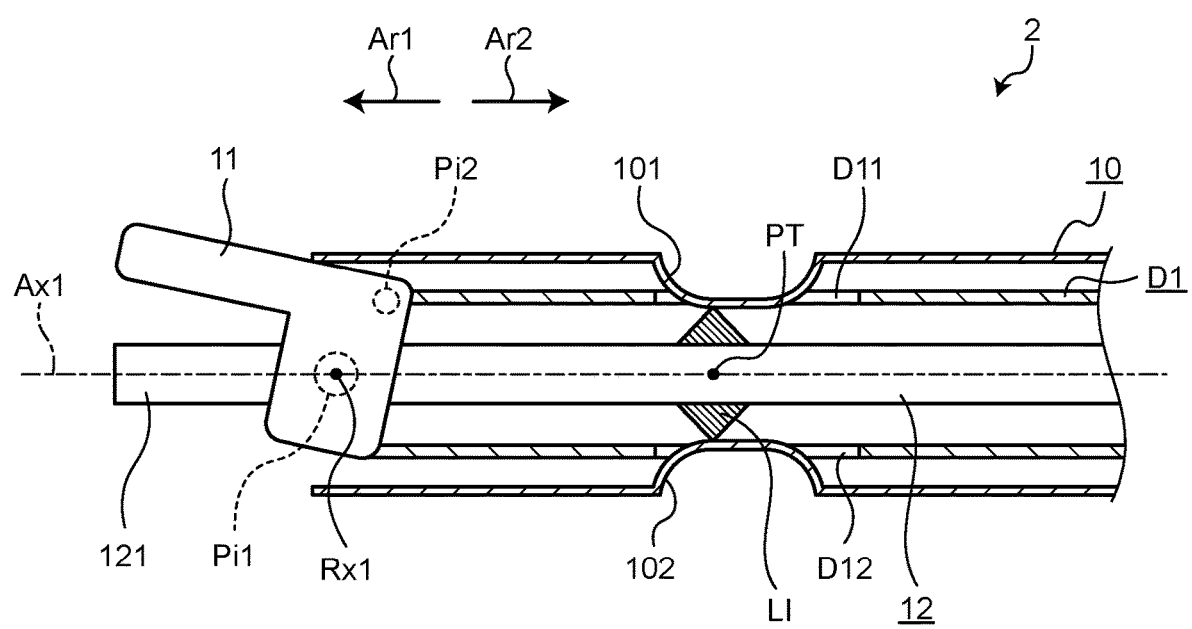
FIG. 17 is a diagram illustrating a seventh modification of the embodiment.

FIG. 17 is a diagram illustrating a seventh modification of the embodiment. Specifically, FIG. 17 is a cross-sectional view corresponding to FIG. 13.

The energy treatment tool 2 according to the fifth modification described above is configured to apply both the ultrasound energy and the high frequency energy to the treatment target, but may be configured to apply only the ultrasound energy thereto. In this case, since it is not necessary to electrically insulate the ultrasound blade 12 from the opening and closing mechanism D1 and the sheath 10, the inner tube TI and the outer tube TO may not be provided, as illustrated in FIG. 17. That is, the pressing portions 101 and 102 directly abut on the lining LI.

Even in a case where the configuration according to the seventh modification described above is adopted, the same effects as those of the fifth modification described above are obtained.

Eighth Modification

Figure 18:
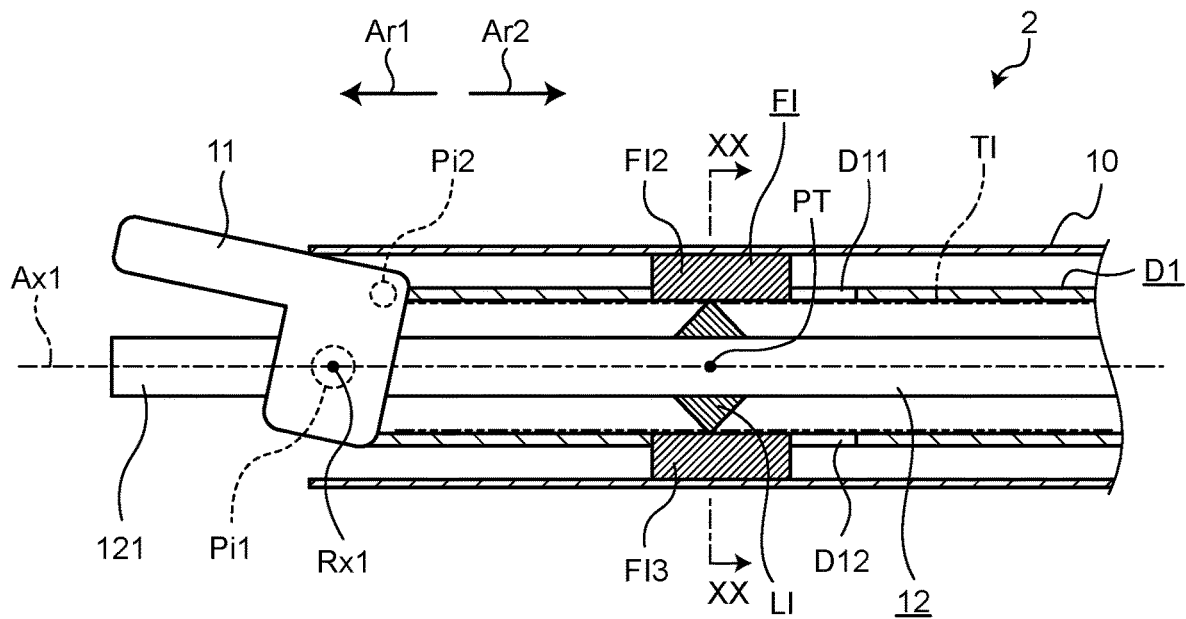
FIG. 18 is a diagram illustrating an eighth modification of the embodiment.
Figure 19:
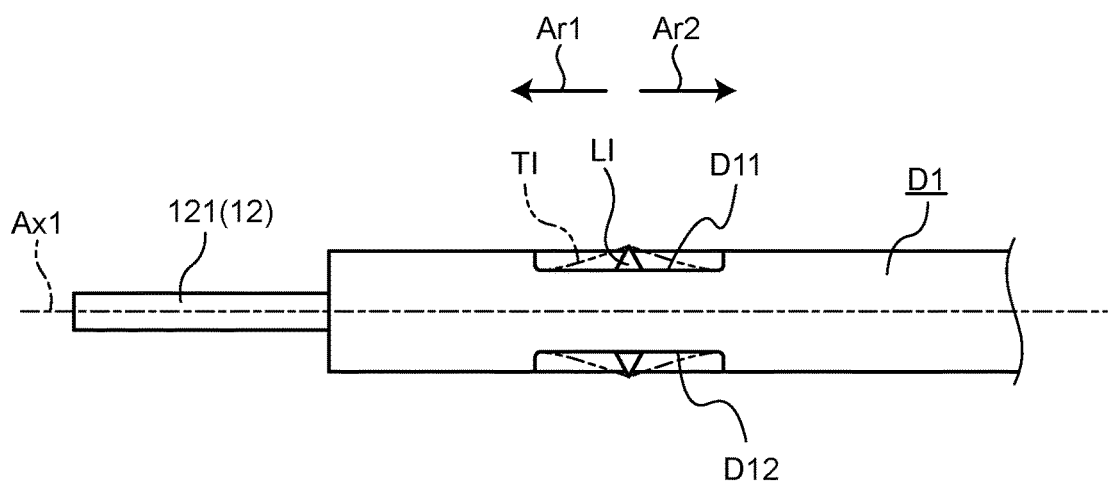
FIG. 19 is a diagram illustrating the eighth modification of the embodiment.
Figure 20:
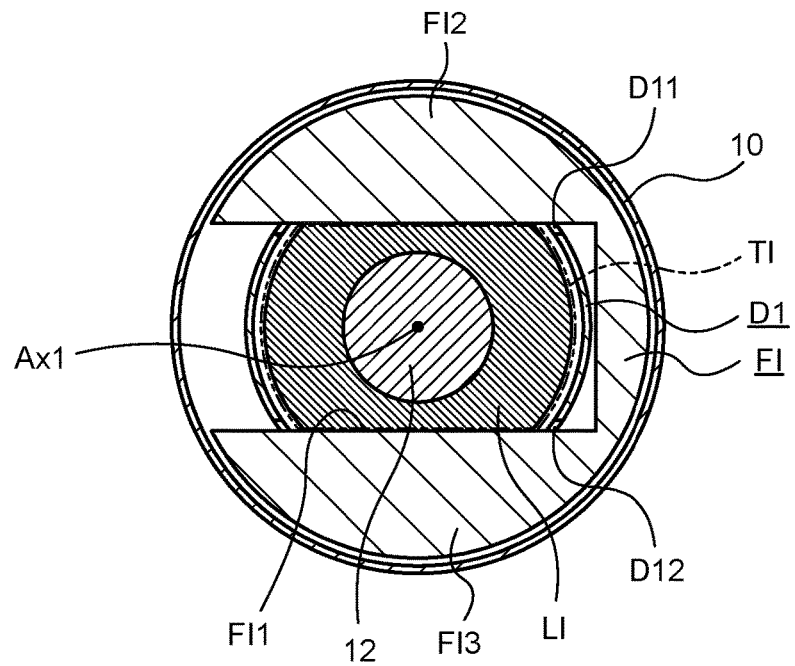
FIG. 20 is a diagram illustrating the eighth modification of the embodiment.

FIGS. 18 to 20 are diagrams illustrating an eighth modification of the embodiment. FIG. 18 is a cross-sectional view corresponding to FIG. 13. FIG. 19 is a diagram illustrating a state in which the ultrasound blade 12 to which the lining LI and the inner tube TI are attached is inserted into the opening and closing mechanism D1 according to the fifth modification when viewed from the side in the width direction. FIG. 20 is a cross-sectional view taken along line XX-XX of FIG. 18.

In the fifth modification described above, a fixing portion FI according to the eighth modification illustrated in FIGS. 18 and 20 may be adopted instead of the pressing portions 101 and 102.

The fixing portion FI has a substantially cylindrical shape having an outer diameter dimension slightly smaller than the inner diameter dimension of the sheath 10. As illustrated in FIG. 20, the fixing portion FI is provided with an insertion portion FI1 cut out in a state of passing through the central axis (central axis Ax1) of the fixing portion FI from the outer peripheral surface and extending in the width direction. That is, the fixing portion FI has a U shape as illustrated in FIG. 20 when viewed along the central axis Ax1. Hereinafter, in the fixing portion FI, one end side and the other end side of the U-shape are referred to as pressing portions FI2 and FI3, respectively.

In order to bring the upper and lower portions of the lining LI protruding to the outside through the through holes D11 and D12 into a state of being pressed by the pressing portions FI2 and FI3, respectively, in FIG. 19, the fixing portion FI is attached in a state where the opening and closing mechanism D1 in the state of FIG. 19 is inserted into the insertion portion FI1. That is, in a state where the opening and closing mechanism D1 to which the fixing portion FI is attached is inserted into the sheath 10, the ultrasound blade 12 is fixed by the sheath 10 through the fixing portion FI.

Even in a case where the configuration according to the eighth modification described above is adopted, the same effects as those of the fifth modification described above are obtained.

Ninth Modification

In the above-described fifth modification, a configuration may be adopted in which through holes similar to the through holes D11 and D12 of the opening and closing mechanism D1 are formed in the inner tube TI, and the pressing portions FI2 and FI3 directly abut on the lining LI.

Even in a case where the configuration according to the ninth modification described above is adopted, the same effects as those of the eighth modification (fifth modification) described above are obtained.

Tenth Modification

Figure 21:
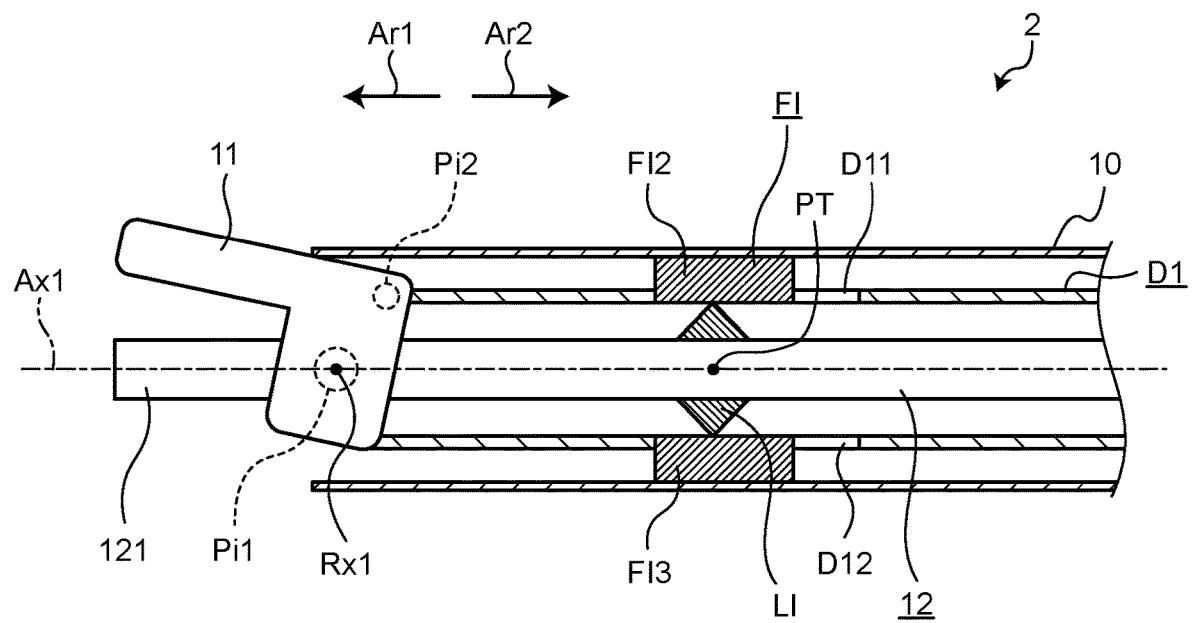
FIG. 21 is a diagram illustrating a tenth modification of the embodiment.

FIG. 21 is a diagram illustrating a tenth modification of the embodiment. Specifically, FIG. 21 is a cross-sectional view corresponding to FIG. 18.

The energy treatment tool 2 according to the eighth modification described above is configured to apply both the ultrasound energy and the high frequency energy to the treatment target, but may be configured to apply only the ultrasound energy thereto. In this case, since it is not necessary to electrically insulate the ultrasound blade 12 from the opening and closing mechanism D1 and the sheath 10, the inner tube TI and the outer tube TO may not be provided, as illustrated in FIG. 21. That is, the pressing portions FI2 and FI3 directly abut on the lining LI.

Even in a case where the configuration according to the tenth modification described above is adopted, the same effects as those of the above-described eighth modification (fifth modification) are obtained.

According to the fifth to tenth modifications described above, the following configurations also belong to the technical scope of the disclosure.

(1) An energy treatment tool including:
- an elongated ultrasound blade configured to treat a treatment target with ultrasound vibration;
- a jaw configured to open and close relative to the ultrasound blade and to grip the treatment target between the jaw and the ultrasound blade;
- a lining provided at a position of a node of the ultrasound vibration in the ultrasound blade;
- a first cylindrical portion including the ultrasound blade inserted thereinto, the first cylindrical portion moving forwards and rearwards in a longitudinal direction of the ultrasound blade to open and close the jaw; and
- a second cylindrical portion including the first cylindrical portion inserted thereinto, wherein the first cylindrical portion includes a cutout portion configured to communicate inside and outside, and the lining is fixed to the second cylindrical portion through the cutout portion.

(2) The energy treatment tool according to (1), wherein the second cylindrical portion fixes the lining by abutting on the lining.

(3) The energy treatment tool according to (1), wherein a fixing portion is interposed between the second cylindrical portion and the lining, and the second cylindrical portion fixes the lining via the fixing portion.

(4) The energy treatment tool according to (1), wherein a high frequency current flows between the ultrasound blade and the jaw.

Eleventh Modification

Figure 22:
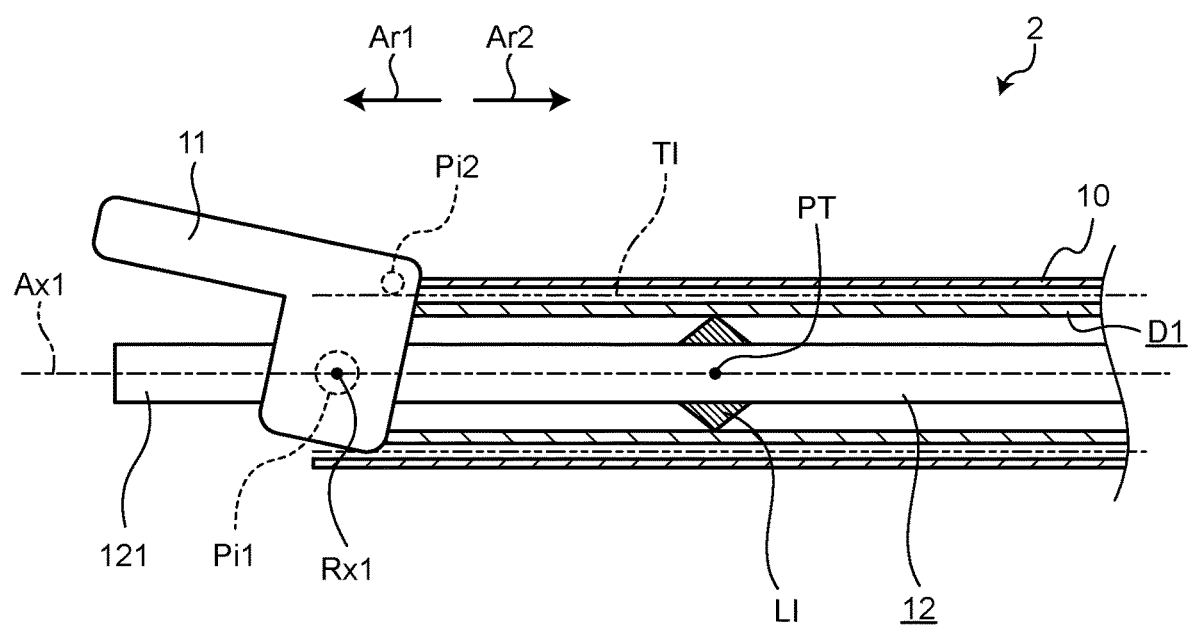
FIG. 22 is a diagram illustrating an eleventh modification of the embodiment.

FIG. 22 is a diagram illustrating an eleventh modification of the embodiment. Specifically, FIG. 22 is a cross-sectional view corresponding to FIG. 13.

The energy treatment tool 2 according to the fifth modification described above is configured to open and close the jaw 11 relative to the treatment portion 121 by moving the first cylindrical portion (opening and closing mechanism D1) to the distal end side Ar1 or the proximal end side Ar2.

On the other hand, the energy treatment tool 2 according to the eleventh modification is configured to open and close the jaw 11 relative to the treatment portion 121 by moving the second cylindrical portion to the distal end side Ar1 or the proximal end side Ar2.

Hereinafter, for convenience of description, the first cylindrical portion corresponding to the opening and closing mechanism D1 according to the fifth modification described above will be referred to as a first cylindrical portion D1, and the second cylindrical portion corresponding to the sheath 10 according to the fifth modification described above will be referred to as a second cylindrical portion 10.

Unlike the opening and closing mechanism D1 according to the fifth modification described above, the first cylindrical portion D1 is fixed to the holding case 6 and does not move to the distal end side Ar1 or the proximal end side Ar2 according to the opening and closing operations on the operation handle 7 by an operator such as a technician. Then, the first cylindrical portion D1 firmly fixes the ultrasound blade 12 through the lining LI. In the first cylindrical portion D1, the first pin Pi1 is fixed to the end portion on the distal end side Ar1. The first cylindrical portion D1 is connected to the jaw 11 by the first pin Pi1.

In the second cylindrical portion 10, the second pin Pi2 is fixed to the end portion on the distal end side Ar1. The second cylindrical portion 10 is electrically connected to the jaw 11 by the second pin Pi2. Note that the second cylindrical portion 10 serves as an electric path connecting the jaw 11 to the electric cable C when high-frequency energy is applied to the treatment target. In addition, the second cylindrical portion 10 moves to the distal end side Ar1 or the proximal end side Ar2 according to the opening and closing operations on the operation handle 7 by an operator such as a technician. The jaw 11 rotates around the first rotation axis Rx1 in conjunction with the movement of the second cylindrical portion 10.

Here, as illustrated in FIG. 22, the inner tube TI according to the eleventh modification is disposed in a state of covering the outer peripheral surface of the first cylindrical portion D1. The first pin Pi1 is made of an electrically insulating material. That is, in order to apply high frequency energy to the treatment target, the first cylindrical portion D1 and the second cylindrical portion 10 are electrically insulated by the inner tube TI and the first pin Pi1.

When the second cylindrical portion 10 is directly connected to the electrode provided in the jaw 11, the second pin Pi2 may be made of an electrically insulating material.

According to the eleventh modification described above, the following effects are obtained in addition to the same effects as those of the above-described embodiments.

In the energy treatment tool 2 according to the eleventh modification, the lining LI provided at the position PT of the node is fixed by the first cylindrical portion D1. That is, the ultrasound blade 12 is fixed by the first cylindrical portion D1.

Therefore, bending of the ultrasound blade 12 when the jaw 11 is closed can be suppressed. In addition, since the second cylindrical portion 10 does not mechanically interfere with the first cylindrical portion D1 when moving to the distal end side Ar1 or the proximal end side Ar2, the movement can be smoothly performed. Therefore, treatment performance can be stabilized.

Twelfth Modification

In the eleventh modification described above, the first cylindrical portion D1 may be made of an electrically insulating material. In this case, the inner tube TI may not be provided, and further, the first pin Pi1 may be made of a conductive material.

Even in a case where the configuration according to the twelfth modification described above is adopted, the same effects as those of the eleventh modification described above are obtained.

Thirteenth Modification

In the eleventh modification described above, both the first cylindrical portion D1 and the second cylindrical portion 10 may be used as an electric path connecting the jaw 11 to the electric cable C when high-frequency energy is applied to the treatment target. In this case, the inner tube TI may be attached in a state of covering the outer peripheral surface of the ultrasound blade 12 having the lining LI attached thereto.

Even in a case where the configuration according to the thirteenth modification described above is adopted, the same effects as those of the eleventh modification described above are obtained.

According to the eleventh to thirteenth modifications described above, the following configurations also belong to the technical scope of the disclosure.

(5) An energy treatment tool including:

an elongated ultrasound blade configured to treat a treatment target with ultrasound vibration;

a jaw configured to open and close relative to the ultrasound blade and to grip the treatment target between the jaw and the ultrasound blade;

a lining provided at a position of a node of the ultrasound vibration in the ultrasound blade;

a first cylindrical portion including the ultrasound blade inserted thereinto, the first cylindrical portion abutting on the lining on an inner peripheral surface of the first cylindrical portion to fix the lining; and a second cylindrical portion including the first cylindrical portion inserted thereinto, the second cylindrical portion moving forwards and rearwards in a longitudinal direction of the ultrasound blade to open and close the jaw, wherein the ultrasound blade and the second cylindrical portion are electrically insulated therebetween.

(6) The energy treatment tool according to (5), wherein the first cylindrical portion is formed of an electrically insulating material.

(7) The energy treatment tool according to (5), wherein a part formed of an electrically insulating material is disposed between the first cylindrical portion and the second cylindrical portion.

(8) The energy treatment tool according to (5), wherein the ultrasound blade and the first cylindrical portion are electrically insulated therebetween.

(9) The energy treatment tool according to (5), wherein a high frequency current flows between the ultrasound blade and the jaw.

According to an energy treatment tool according to the disclosure, deterioration of a pad can be suppressed.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An energy treatment tool, comprising:
    a blade configured to transmit ultrasound vibration;
    an arm movable relative to the blade between an open position and a closed position, the arm including a surface on a blade-side of the arm;
    a pad provided on the surface, the pad including a first side and a second side opposite to the first side in a width direction of the arm;
    a first pin connected to the arm and extending along the width direction;
    a first electrode facing the first side of the pad and rotatable relative to the pad around the first pin; and
    a second electrode facing the second side of the pad.

2. The energy treatment tool according to claim 1, wherein the arm includes a through-hole that penetrates the arm in the width direction,
    wherein the first pin is inserted into the through-hole, and
    wherein the second electrode is rotatable relative to the pad around the first pin.

3. The energy treatment tool according to claim 2, wherein the first electrode is configured to rotate in conjunction with the second electrode.

4. The energy treatment tool according to claim 2, wherein the first electrode is configured to rotate independently of the second electrode.

5. The energy treatment tool according to claim 1, further comprising a second pin about which the second electrode is rotatable and defining a second side pin,
    wherein the first pin about which the first electrode is rotatable defines a first side pin, and
    wherein the first side pin is a first protrusion extending from a first side of the arm and the second side pin is a second protrusion extending from a second side of the arm.

6. The energy treatment tool according to claim 5, wherein the first electrode is configured to rotate in conjunction with the second electrode.

7. The energy treatment tool according to claim 5, wherein the first electrode is configured to rotate independently of the second electrode.

8. The energy treatment tool according to claim 1, wherein the blade is configured to flow a high frequency current between the blade and the first electrode and between the blade and the second electrode.

9. The energy treatment tool according to claim 1, wherein, when the pad is in the closed position, the first electrode and the second electrode are spaced apart from the blade.

10. The energy treatment tool according to claim 1, further comprising a rotation regulation portion configured to regulate a rotation range of the first electrode relative to the arm.

11. The energy treatment tool according to claim 10, wherein the rotation regulation portion includes:
    a first groove provided in the first electrode, and
    a first detent protruding from the arm and inserted into the first groove, and
    wherein the first groove has an arc shape centered on the first pin.

12. The energy treatment tool according to claim 10, wherein the rotation regulation portion includes at least one stop provided in the arm, the at least one stop protruding from the arm and abutting an outer edge of the first electrode when the first electrode is at a limit of the rotation range.

13. The energy treatment tool according to claim 10, wherein the rotation regulation portion is an electrically insulating cover provided in the arm, the cover abutting an outer edge of the first electrode when the first electrode is at a limit of the rotation range.

14. The energy treatment tool according to claim 10, wherein the first electrode and the second electrode are separated from the blade within the rotation range regulated by the rotation regulation portion.

15. The energy treatment tool according to claim 14, wherein the first electrode and the second electrode include an electrically insulating gap material configured to abut on the blade.

16. The energy treatment tool according to claim 8, wherein the high frequency current is supplied to the first electrode and the second electrode via the arm and the first pin.

17. The energy treatment tool according to claim 1, wherein the blade has a first curved shape, and
    wherein each of the arm, the pad, and the first electrode and the second electrode has a second curved shape, and
    wherein the first curved shape has a first curvature and the second curved shape has a second curvature, and the first curvature is the same as the second curvature.

18. The energy treatment tool according to claim 1, wherein, in the width direction, the arm is between the first electrode and second electrode.

19. The energy treatment tool according to claim 1, wherein, in the width direction, the pad is between the first electrode and second electrode.

20. The energy treatment tool according to claim 12, wherein the at least one stop protruding from the arm extends in the width direction.

* * * * *